(12) United States Patent
Liao

(10) Patent No.: US 8,194,295 B2
(45) Date of Patent: Jun. 5, 2012

(54) DUPLEX SCANNING APPARATUS

(75) Inventor: Chi-Chao Liao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 491 days.

(21) Appl. No.: 12/574,030

(22) Filed: Oct. 6, 2009

(65) Prior Publication Data
US 2011/0043868 A1 Feb. 24, 2011

(30) Foreign Application Priority Data

Aug. 21, 2009 (TW) .............................. 98128175 A

(51) Int. Cl.
*H04N 1/04* (2006.01)

(52) U.S. Cl. ........ 358/496; 358/408; 358/483; 358/498; 358/474

(58) Field of Classification Search .................. None
See application file for complete search history.

(56) References Cited

U.S. PATENT DOCUMENTS

| | | | | |
|---|---|---|---|---|
| 4,536,077 A * | 8/1985 | Stoffel | ............................ | 358/497 |
| 5,463,451 A * | 10/1995 | Acquaviva et al. | ............ | 399/211 |
| 6,055,070 A * | 4/2000 | Kang | ............................ | 358/497 |
| 6,563,611 B1 * | 5/2003 | Kao | ............................ | 358/498 |
| 6,721,074 B1 * | 4/2004 | Kao | ............................ | 358/496 |
| 7,414,762 B2 * | 8/2008 | Poletto | ............................ | 358/496 |
| 7,554,703 B2 * | 6/2009 | Tsai et al. | ............................ | 358/483 |
| 7,612,925 B2 * | 11/2009 | Tseng | ............................ | 358/496 |
| 7,817,310 B2 * | 10/2010 | Hui | ............................ | 358/449 |

\* cited by examiner

*Primary Examiner* — Cheukfan Lee
(74) *Attorney, Agent, or Firm* — Kirton McConkie; Evan R. Witt

(57) ABSTRACT

A duplex scanning apparatus includes an automatic document feeder and a flatbed image scanner. The automatic document feeder includes a document feeder case, a scanning glass plate and a first light source. The flatbed image scanner includes a scanner case, a glass platform, a second light source and a scanning module. The scanning glass plate and the first light source are included in the automatic document feeder of the duplex scanning apparatus, so that the scanning operation is performed in the automatic document feeder.

20 Claims, 3 Drawing Sheets

DUPLEX SCANNING APPARATUS

FIELD OF THE INVENTION

The present invention relates to a duplex scanning apparatus, and more particularly to a duplex scanning apparatus for performing a duplex scanning operation.

BACKGROUND OF THE INVENTION

Image scanners are widely used for scanning images of documents, photographs or films. The scanned images can be converted into electronic files, which are then stored, processed or spread. With increasing development of scanning technologies, the image scanners have experienced great growth and are now rapidly gaining in popularity.

In the early stage, the image scanner can scan one side of the document. For scanning both sides of the document, after one side of the document has been scanned, the document should be manually turned over so as to scan the other side of the document. As known, the process of manually turning over the document is troublesome. For solving the drawbacks, an automatic document feeder is usually integrated into the scanning apparatus. After a stack of documents to be scanned are placed on the sheet input tray of the automatic document feeder, the sheet-feeding mechanism of the automatic document feeder will successively transport the sheet to perform the scanning operation without the need of manually turning over the documents.

As the demand on the duplex scanning operation is gradually increased, a duplex scanning apparatus is disclosed for automatically performing the duplex scanning operation in order to scan both sides of the document.

Generally, the duplex scanning apparatuses are classified into two types. The first type of duplex scanning apparatus uses only one scanning module to scan both sides of the document. Since there is only one scanning module, a specified mechanism is required to turn over the document after one side of the document has been scanned. For performing the duplex scanning operation by the duplex scanning apparatus, the document needs to pass through the scan region for two or three times. As a consequence, the duplex scanning operation by the duplex scanning apparatus having one scanning module is also referred as a two-pass or three-pass scanning operation. The use of this duplex scanning apparatus to perform the duplex scanning operation, however, is time-consuming.

The second type of duplex scanning apparatus has two scanning modules. These two scanning modules are disposed at bilateral sides of the scan region. When the document is transported across the scan region, the two scanning modules simultaneously scan front and back sides of the document. In other words, the document needs to pass through the scan region for only one time to perform the duplex scanning operation. As a consequence, the duplex scanning operation by the duplex scanning apparatus having two scanning modules is also referred as a one-pass scanning operation. In comparison with the first type, the second type of duplex scanning apparatus has an increased scanning speed.

With increasing development of scanning apparatuses, the above two types of duplex scanning apparatuses fail to meet the users' requirements. For solving these drawbacks, Taiwanese Patent Publication No. 00571561 discloses a duplex scanning apparatus for performing a one-pass scanning operation without the need of manually turning over the documents. This duplex scanning apparatus comprises a scanning module. FIG. 1 is a schematic view illustrating a conventional duplex scanning apparatus disclosed in Taiwanese Patent Publication No. 00571561. As shown in FIG. 1, the conventional duplex scanning apparatus 1 comprises an automatic document feeder 11 and a scanning module 12. The scanning module 12 comprises a light source 121, a reflective mirror 122, a lens 123 and an optical sensing element 124. The automatic document feeder 11 comprises a sheet input tray 111, a sheet inverting region 112, a sheet ejecting tray 113, a first scan region 114, a second scan region 115, a light-transmissive channel 116, and a plurality of sheet transfer rollers 1171, 1172, 118 and 119.

For performing a duplex scanning operation on a document (not shown) by the duplex scanning apparatus 1, the document is fed into the internal portion of the duplex scanning apparatus 1 through the sheet input tray 111 and transported by the transfer rollers 1171 and 1172. When the document is transported across the first scan region 114, the light beam emitted by the light source 121 of the scanning module 12 is transmitted through the light-transmissive channel 116 and projected on a first side of the document. The light beam is reflected by the document and then directed to the reflective mirror 122. The light beam is then reflected by the reflective mirror 122 and transmitted through the lens 123. Next, the light beam is received by the optical sensing element 124, thereby obtaining the image of the first side of the document. Next, the document is transported across the sheet inverting region 112, and then transported to the second scan region 115 by the sheet transfer roller 118. After the document is transported across the sheet inverting region 112, the document is turned over. When the document is transported across the second scan region 115, a second side of the document is scanned by the scanning module 12 according to the above-mentioned method. Afterwards, the document is transported by the sheet transfer roller 119 and then exited from the duplex scanning apparatus 1 through the sheet ejecting tray 113.

From the above discussion, it is found that the scanning module 12 of the conventional duplex scanning apparatus 1 could scan the first side and the second side of the document at the first scanning region 114 and the second scan region 115, respectively. The conventional duplex scanning apparatus 1, however, still has some drawbacks. Since the distance between the light source 121 and the first scanning region 114 is too far, the brightness of the light beam emitted by the light source 121 is too weak, and the light beam emitted by the light source 121 usually fails to be effectively projected on the document. Under this circumstance, the efficacy of performing duplex scanning operation is insufficient. Even if the intensity of the light source is increased to be projected on the document, the scanning quality is still deteriorated.

SUMMARY OF THE INVENTION

It is an object of the present invention provides a duplex scanning apparatus for performing a one-pass scanning operation while maintaining high scanning quality.

In accordance with an aspect of the present invention, there is provided a duplex scanning apparatus for scanning an image of a document. The duplex scanning apparatus includes an automatic document feeder and a flatbed image scanner. The automatic document feeder is used for transporting the document. The automatic document feeder includes a document feeder case, a scanning glass plate and a first light source. The scanning glass plate is disposed in a first scan region. The first light source is disposed beside the first scan region for emitting a first light beam. The first light beam is projected on a first side of the document. The flatbed image scanner is used for scanning the document. The flatbed image scanner includes a scanner case, a glass platform, a second light source and a scanning module. The scanner case is disposed under the document feeder case, and includes a first perforation and a second perforation. The first perforation is arranged under the first scan region. The second perforation is arranged under a second scan region. The glass platform covers the first perforation and the second perforation. The second light source is disposed beside the second scan region for emitting a second light beam. The second light source is projected on a second side of the document. The scanning module is used for scanning the document. The scanning module includes a movable reflective mirror, a plurality of fixed reflective mirrors for reflecting the first light beam or the second light beam, an optical sensing module for receiving the first light beam or the second light beam, and a transmission mechanism connected with the movable reflective mirror for rotating the movable reflective mirror by a first angle or a second angle. The first light beam is reflected by the movable reflective mirror when the movable reflective mirror is rotated by the first angle. The second light beam is reflected by the movable reflective mirror when the movable reflective mirror is rotated by the second angle. The optical path length of the first light beam is substantially equal to that of the second light beam.

In an embodiment, the optical sensing module includes a lens and an optical sensor. The lens is used for focusing the first light beam or the second light beam. The optical sensor is used for receiving the first light beam or the second light beam, and converting first light beam or the second light beam into a corresponding electronic signal.

In an embodiment, the optical sensor is a charge coupled device (CCD).

In an embodiment, the automatic document feeder further includes a sheet-pressing element. The sheet-pressing element is disposed in the first scan region for pressing the document, so that the document is kept flat while passing through the first scan region.

In an embodiment, the sheet-pressing element is a sheet-pressing slice.

In an embodiment, the document feeder case further includes a light-transmissive channel arranged between the scanning glass plate and the flatbed image scanner, so that the first light beam is permitted to be directed to the flatbed image scanner through the light-transmissive channel.

In an embodiment, the automatic document feeder further includes a sheet transfer channel for leading the document, and the sheet transfer channel runs through the first scan region and the second scan region.

In an embodiment, the overall length of the sheet transfer channel from the first scan region to the second scan region is greater than or equal to a letter-size length.

In an embodiment, the automatic document feeder further includes a sheet input tray and a sheet ejecting tray. The sheet input tray is arranged at a first terminal of the sheet transfer channel for placing the document that has not been scanned. The sheet ejecting tray is arranged at a second terminal of the sheet transfer channel for placing the document that has been scanned.

In an embodiment, the automatic document feeder further includes a plurality of transfer roller assemblies, which are arranged in the sheet transfer channel for transporting the document in the sheet transfer channel.

In accordance with another aspect of the present invention, there is provided a duplex scanning apparatus for scanning an image of a document. The duplex scanning apparatus includes an automatic document feeder and a flatbed image scanner. The automatic document feeder is used for transporting the document. The automatic document feeder includes a document feeder case, a scanning glass plate and a first light source. The scanning glass plate is disposed in a first scan region. The first light source is disposed beside the first scan region for emitting a first light beam. The first light beam is projected on a first side of the document. The flatbed image scanner is used for scanning the document. The flatbed image scanner includes a scanner case, a glass platform, a second light source and a scanning module. The scanner case is disposed under the document feeder case, and includes a first perforation and a second perforation. The first perforation is arranged under the first scan region. The second perforation is arranged under a second scan region. The glass platform covers the first perforation and the second perforation. The second light source is disposed beside the second scan region for emitting a second light beam. The second light source is projected on a second side of the document. The scanning module is used for scanning the document. The scanning module includes a movable reflective mirror, a plurality of fixed reflective mirrors for reflecting the first light beam or the second light beam, an optical sensing module for receiving the first light beam or the second light beam, and a transmission mechanism connected with the movable reflective mirror for moving the movable reflective mirror to a first position or a second position. The first light beam is reflected by the movable reflective mirror when the movable reflective mirror is located at the first position. The second light beam is reflected by the movable reflective mirror when the movable reflective mirror is located at the second position. The optical path length of the first light beam is substantially equal to that of the second light beam.

In an embodiment, the optical sensing module includes a lens and an optical sensor. The lens is used for focusing the first light beam or the second light beam. The optical sensor is used for receiving the first light beam or the second light beam, and converting first light beam or the second light beam into a corresponding electronic signal.

In an embodiment, the optical sensor is a charge coupled device (CCD).

In an embodiment, the automatic document feeder further includes a sheet-pressing element. The sheet-pressing element is disposed in the first scan region for pressing the document, so that the document is kept flat while passing through the first scan region.

In an embodiment, the sheet-pressing element is a sheet-pressing slice.

In an embodiment, the document feeder case further includes a light-transmissive channel arranged between the scanning glass plate and the flatbed image scanner, so that the first light beam is permitted to be directed to the flatbed image scanner through the light-transmissive channel.

In an embodiment, the automatic document feeder further includes a sheet transfer channel for leading the document, and the sheet transfer channel runs through the first scan region and the second scan region.

In an embodiment, the overall length of the sheet transfer channel from the first scan region to the second scan region is greater than or equal to a letter-size length.

In an embodiment, the automatic document feeder further includes a sheet input tray and a sheet ejecting tray. The sheet input tray is arranged at a first terminal of the sheet transfer channel for placing the document that has not been scanned. The sheet ejecting tray is arranged at a second terminal of the sheet transfer channel for placing the document that has been scanned.

In an embodiment, the automatic document feeder further includes a plurality of transfer roller assemblies, which are arranged in the sheet transfer channel for transporting the document in the sheet transfer channel.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
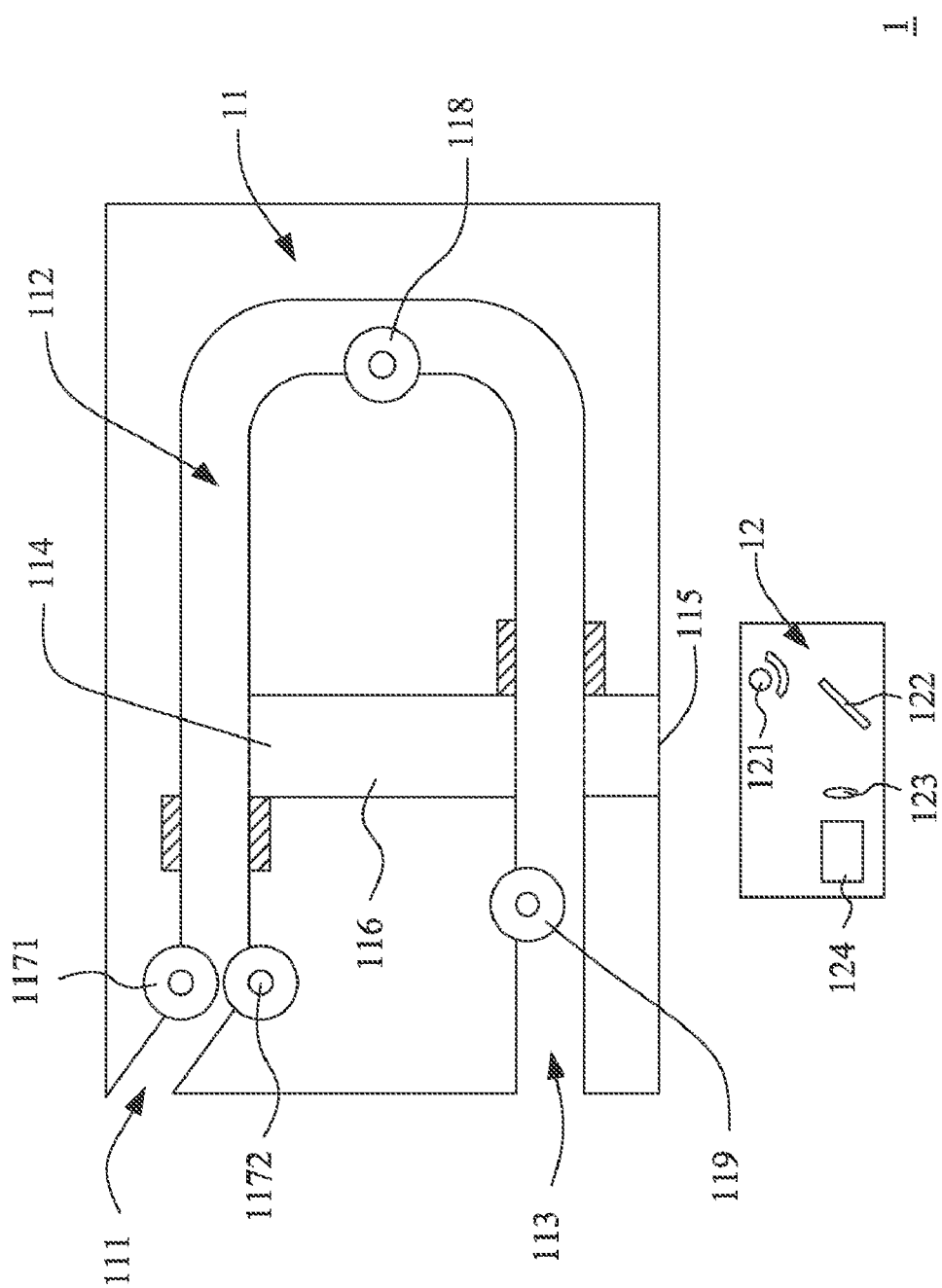
FIG. 1 is a schematic view illustrating a conventional duplex scanning apparatus.
Figure 2:
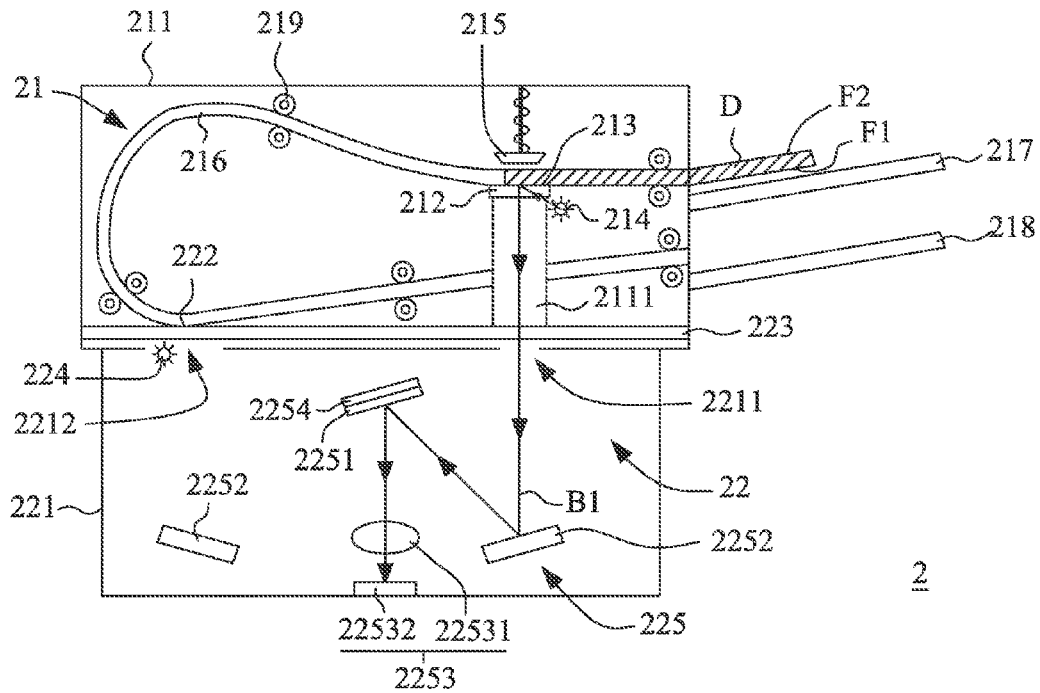
FIG. 2 is a schematic view illustrating a duplex scanning apparatus for scanning a first side of a document according to a first embodiment of the present invention.

FIG. 2 is a schematic view illustrating a duplex scanning apparatus for scanning a first side of a document according to a first embodiment of the present invention. As shown in FIG. 2, the duplex scanning apparatus 2 comprises an automatic document feeder 21 and a flatbed image scanner 22. The automatic document feeder 21 is used for scanning a document D. The automatic document feeder 21 comprises a document feeder case 211, a scanning glass plate 212, a first light source 214, a sheet-pressing element 215, a sheet transfer channel 216, a sheet input tray 217, a sheet ejecting tray 218, and a plurality of transfer roller assemblies 219. The document feeder case 211 comprises a light-transmissive channel 2111. The scanning glass plate 212 is disposed in a first scan region 213. The light-transmissive channel 2111 is arranged between the scanning glass plate 212 and the flatbed image scanner 22. The first light source 214 is disposed beside the first scan region 213 for emitting a first light beam B1. The first light beam B1 is projected on a first side F1 of the document D. The sheet-pressing element 215 is disposed in the first scan region 213 for pressing the document D, so that the document D is kept flat while passing through the first scan region 213. An example of the sheet-pressing element 215 is a sheet-pressing slice. The sheet transfer channel 216 is used for leading the document D. The sheet transfer channel 216 runs through the first scan region 213 and a second scan region 222. The sheet input tray 217 is arranged at a first terminal of the sheet transfer channel 216 for placing the document D that has not been scanned. The sheet ejecting tray 218 is arranged at a second terminal of the sheet transfer channel 216 for placing the document D that has been scanned. The transfer roller assemblies 219 are arranged in the sheet transfer channel 216 for transporting the document D in the sheet transfer channel 216.

The flatbed image scanner 22 is used for scanning the document D. The flatbed image scanner 22 comprises a scanner case 221, a glass platform 223, a second source 224 and a scanning module 225. The scanner case 221 is disposed under the document feeder case 211. The scanner case 221 has a first perforation 2211 and a second perforation 2212. The first perforation 2211 is arranged under the first scan region 213. The second perforation 2212 is arranged under the second scan region 222. The first perforation 2211 and the second perforation 2212 are covered by the glass platform 223. The second source 224 is disposed beside the second scan region 222 for emitting a second light beam B2. The second light beam B2 is projected on a second side F2 of the document D. The scanning module 225 is used for scanning the document D. The scanning module 225 comprises a movable reflective mirror 2251, a plurality of fixed reflective mirrors 2252, an optical sensing module 2253 and a transmission mechanism 2254. In a case that the movable reflective mirror 2251 is rotated by a first angle, the first light beam B1 could be reflected by the movable reflective mirror 2251. Whereas, in a case that the movable reflective mirror 2251 is rotated by a second angle, the second light beam B2 could be reflected by the movable reflective mirror 2251. The fixed reflective mirrors 2252 are used for reflecting the first light beam B1 or the second light beam B2. The optical sensing module 2253 is used for receiving the first light beam B1 or the second light beam B2, thereby obtaining the image of the first side or the second side of the document D. The optical sensing module 2253 comprises a lens 22531 and an optical sensor 22532. The lens 22531 is used for focusing the first light beam B1 or the second light beam B2. When the focused first light beam B1 or the focused second light beam B2 are received by the optical sensor 22532, these optical signals are converted into corresponding electronic signals. An example of the optical sensor 22532 is a charge coupled device (CCD). The transmission mechanism 2254 is connected to the movable reflective mirror 2251 for adjusting the angle of the movable reflective mirror 2251.

Hereinafter, the procedure of performing a duplex scanning operation by the duplex scanning apparatus 2 will be illustrated with reference to FIG. 2. First of all, the document D to be duplex-scanned by the duplex scanning apparatus 2 is placed on the sheet input tray 217, wherein the first side F1 of the document D faces downwardly but the second side F2 of the document D faces upwardly. Once the scanning procedure starts, the document D is fed into the sheet transfer channel 216 by the transfer roller assemblies 219. Next, the document D is introduced to the first scan region 213 and transported across the scanning glass plate 212. During the document D is transported across the first scan region 213, the document D is pressed by the sheet-pressing element 215, so that the document D is maintained flat to be effectively scanned. Moreover, the first source 214 beside the first scan region 213 emits the first light beam B1. The first light beam B1 is projected on the first side F1 of the document D. Next, the first light beam B1 is reflected by the first side F1 of the document D, and then directed to the fixed reflective mirror 2252 under the first perforation 2211 through the scanning glass plate 212, the light-transmissive channel 2111, the glass platform 223 and the first perforation 2211. Next, the first light beam B1 is reflected by the fixed reflective mirror 2252 and directed to the movable reflective mirror 2251. Next, the first light beam B1 is reflected by the movable reflective mirror 2251, transmitted through the lens 22531, and received by the optical sensor 22532. Meanwhile, the first light beam B1 is imaged on the optical sensor 22532 and converted into a corresponding electronic signal. As the document D is moved in the first scan region 213, the first light beam B1 is projected on the document D. After the document D is existed from the first scan region 213, the first side F1 of the document D has been scanned.

The document D is continuously moved in the sheet transfer channel 216, and then transported to the second scan region 222 by the transfer roller assemblies 219. In particular, an inverting region is arranged between the first scan region 213 and the second scan region 222. Due to the inverting region, the second side F2 of the document D faces downwardly before the document D is introduced to the second scan region 222 (see FIG. 3).

Figure 3:
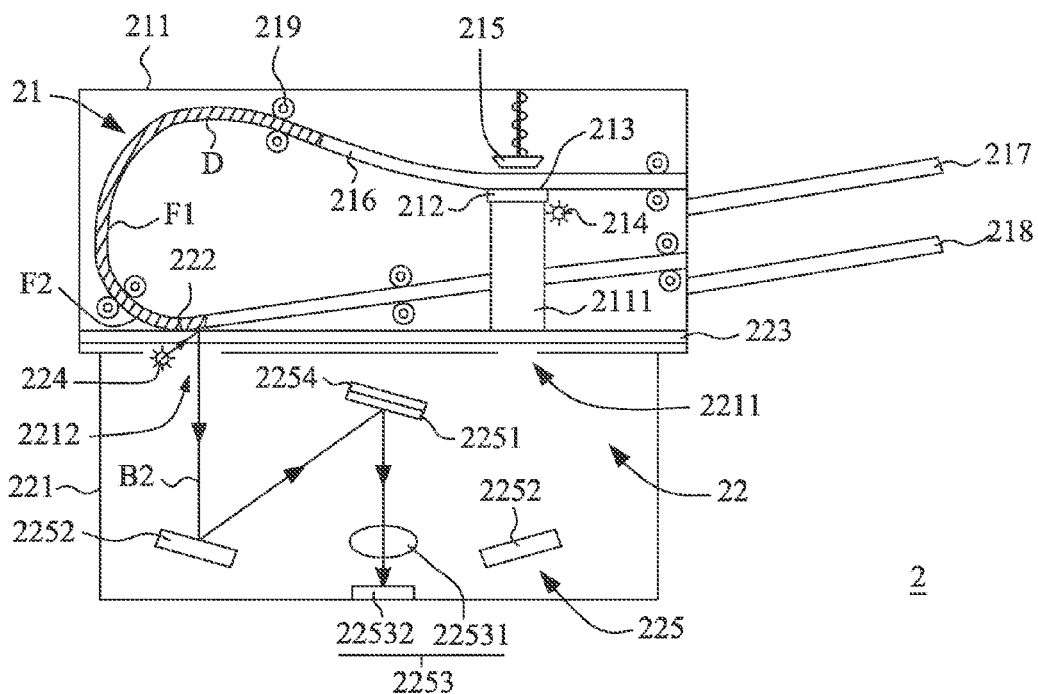
FIG. 3 is a schematic view illustrating a duplex scanning apparatus for scanning a second side of a document according to the first embodiment of the present invention.

FIG. 3 is a schematic view illustrating a duplex scanning apparatus for scanning a second side of a document according to the first embodiment of the present invention. By the transmission mechanism 2254, the movable reflective mirror 2251 is rotated from the first angle to the second angle. When document D is introduced to the second scan region 222, the second source 224 beside the second scan region 222 emits the second light beam B2. The second light beam B2 is projected on the second side F2 of the document D. Next, the second light beam B2 is reflected by the second side F2 of the document D, and then directed to the fixed reflective mirror 2252 under the second perforation 2212 through the glass platform 223 and the second perforation 2212. Next, the second light beam B2 is reflected by the fixed reflective mirror 2252 and directed to the movable reflective mirror 2251. Next, the second light beam B2 is reflected by the movable reflective mirror 2251, transmitted through the lens 22531, and received by the optical sensor 22532. Meanwhile, the second light beam B2 is imaged on the optical sensor 22532 and converted into a corresponding electronic signal. After the document D is existed from the first scan region 213, the second side F2 of the document D has been scanned. During the first side and the second side of the document D are scanned, the optical path length of the first light beam B1 is substantially equal to that of the second light beam B2. Next, the document D is transported to the sheet ejecting tray 218 by the transfer roller assemblies 219, and thus the duplex scanning operation is completed.

As described in FIGS. 2 and 3, the duplex scanning apparatus 2 utilizes a scanning module 225 to scan the first side and the second side of the document D in the scan regions 213 and 222, respectively. For assuring that there is a sufficient time period to adjust the angle of the movable reflective mirror 2251 of the scanning module 225 to effectively scan the second side F2 of the document D, the overall length of the sheet transfer channel 216 from the first scan region 213 to the second scan region 222 should be long enough. In accordance with the present invention, the overall length of the sheet transfer channel 216 from the first scan region 213 to the second scan region 222 is greater than or equal to a letter-size length. In this embodiment, the overall length of the sheet transfer channel 216 from the first scan region 213 to the second scan region 222 is equal to the letter-size width.

Figure 4:
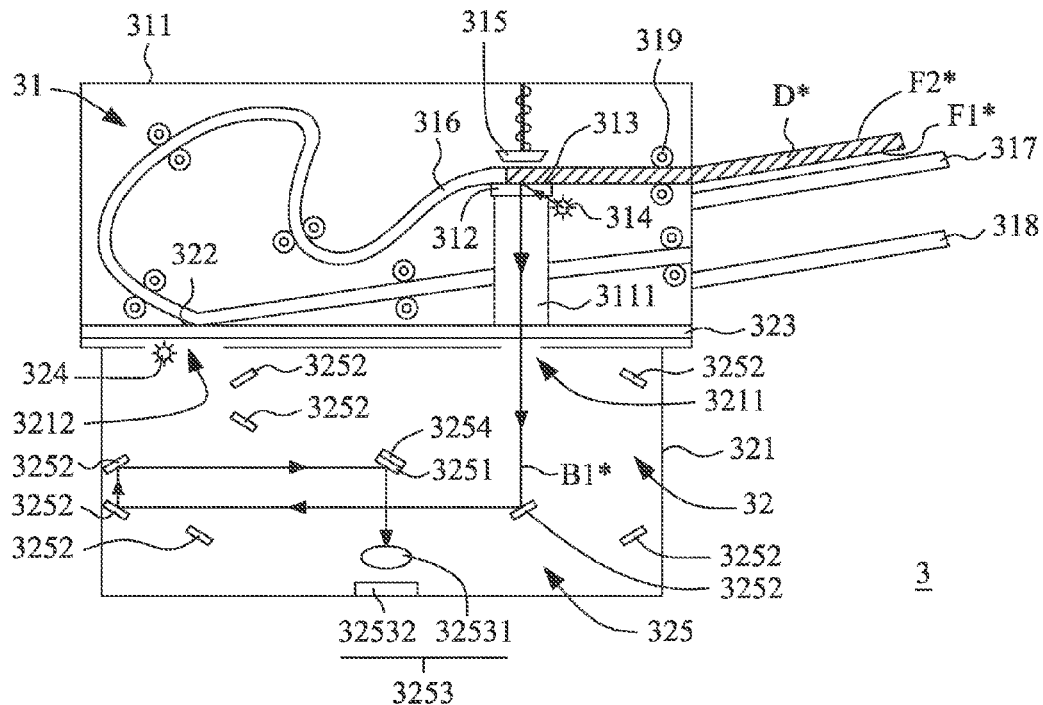
FIG. 4 is a schematic view illustrating a duplex scanning apparatus for scanning a first side of a document according to a second embodiment of the present invention.

FIG. 4 is a schematic view illustrating a duplex scanning apparatus for scanning a first side of a document according to a second embodiment of the present invention. As shown in FIG. 4, the duplex scanning apparatus 3 comprises an automatic document feeder 31 and a flatbed image scanner 32. The automatic document feeder 31 comprises a document feeder case 311, a scanning glass plate 312, a first light source 314, a sheet-pressing element 315, a sheet transfer channel 316, a sheet input tray 317, a sheet ejecting tray 318, and a plurality of transfer roller assemblies 319. The document feeder case 311 comprises a light-transmissive channel 3111. The scanning glass plate 312 is disposed in a first scan region 313. The light-transmissive channel 2111 is arranged between the scanning glass plate 312 and the flatbed image scanner 32.

The flatbed image scanner 32 comprises a scanner case 321, a glass platform 323, a second source 324 and a scanning module 325. The scanner case 321 has a first perforation 3211 and a second perforation 3212. The scanning module 325 comprises a movable reflective mirror 3251, a plurality of fixed reflective mirrors 3252, an optical sensing module 3253 and a transmission mechanism 3254. The optical sensing module 3253 comprises a lens 32531 and an optical sensor 32532. Except that the transmission mechanism 3254 is connected with the movable reflective mirror 3251 to move the movable reflective mirror 3251, the configurations and the functions of other components included in the duplex scanning apparatus 3 are substantially identical to those of the first embodiment.

Hereinafter, the procedure of performing a duplex scanning operation by the duplex scanning apparatus 3 will be illustrated with reference to FIG. 4. As shown in FIG. 4, the movable reflective mirror 3251 of the flatbed image scanner 32 is located at a first position. First of all, the document D* to be duplex-scanned by the duplex scanning apparatus 3 is placed on the sheet input tray 317, wherein the first side F1* of the document D* faces downwardly but the second side F2* of the document D* faces upwardly. Once the scanning procedure starts, the document D* is fed into the sheet transfer channel 316 by the transfer roller assemblies 319. Next, the document D* is introduced to the first scan region 313. During the document D* is transported across the first scan region 313, the document D* is pressed on the scanning glass plate 312 by the sheet-pressing element 315, so that the document D* is maintained flat to be effectively scanned. Moreover, the first source 314 beside the first scan region 313 emits a first light beam B1*. The first light beam B1* is projected on the first side F1* of the document D*. Next, the first light beam B1* is reflected by the first side F1* of the document D*, and then directed into the flatbed image scanner 32 through the scanning glass plate 312, the light-transmissive channel 3111, the glass platform 323 and the first perforation 3211. After the first light beam B1* is directed into the flatbed image scanner 32, the first light beam B1* is successively reflected by the fixed reflective mirror 3252 under the first perforation 3211 and other two fixed reflective mirrors 3252, and directed to the movable reflective mirror 3251 that is located at the first position. Next, the first light beam B1* is reflected by the movable reflective mirror 3251, transmitted through the first lens 32531, and received by the optical sensor 32532. After the document D* is existed from the first scan region 313, the first side F1* of the document D* has been scanned.

Figure 5:
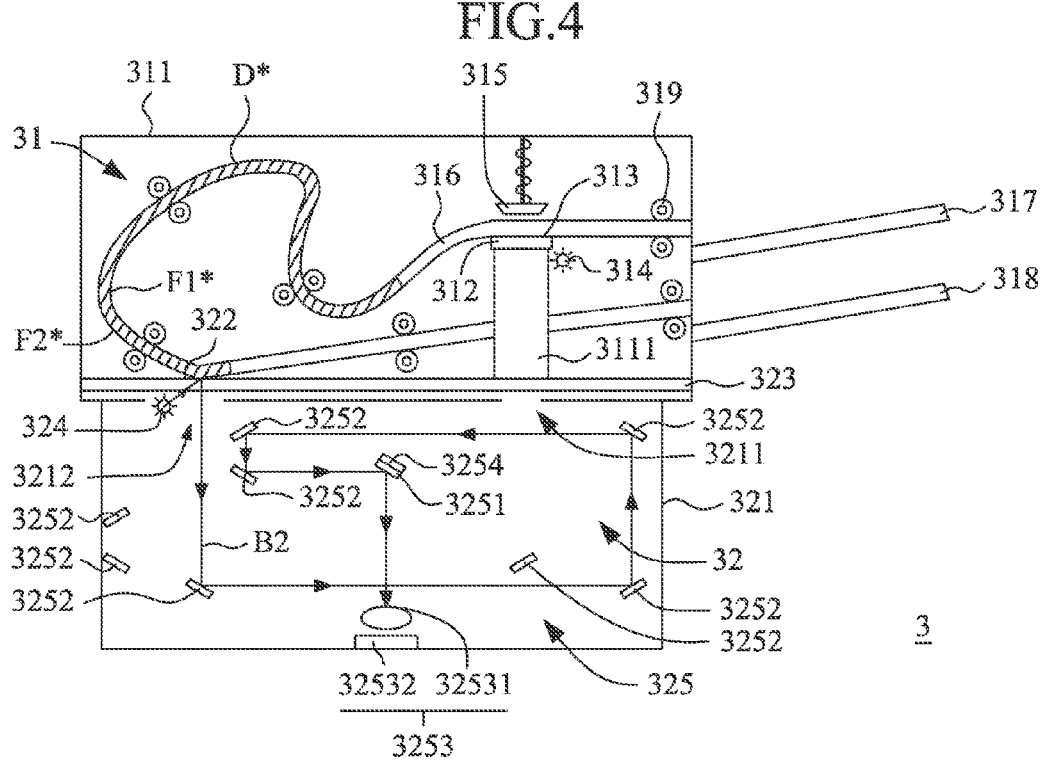
FIG. 5 is a schematic view illustrating a duplex scanning apparatus for scanning a second side of a document according to the second embodiment of the present invention.

FIG. 5 is a schematic view illustrating a duplex scanning apparatus for scanning a second side of a document according to the second embodiment of the present invention. The document D* is continuously moved in an inverting region of the sheet transfer channel 316. The inverting region is arranged between the first scan region 313 and the second scan region 322. Due to the inverting region, the second side F2* of the document D* faces downwardly before the document D* is introduced to the second scan region 322.

In the flatbed image scanner 32, the movable reflective mirror 3251 is moved from the first position to the second position by the transmission mechanism 3254. When document D* is introduced to the second scan region 322, the second source 324 beside the second scan region 322 emits the second light beam B2*. The second light beam B2* is projected on the second side F2* of the document D*. Next, the second light beam B2* is reflected by the second side F2* of the document D*, and then directed to the fixed reflective mirror 3252 under the second perforation 3212 through the glass platform 323 and the second perforation 3212. The second light beam B2* is successively reflected by some of the fixed reflective mirrors 3252 and directed to the movable reflective mirror 3251 that is located at the second position. Next, the second light beam B2* is reflected by the movable reflective mirror 3251, transmitted through the first lens 32531, and received by the optical sensor 32532. After the document D* is existed from the first scan region 313, the second side F2* of the document D* has been scanned. During the first side and the second side of the document D* are scanned, the optical path length of the first light beam B1* is substantially equal to that of the second light beam B2*. Next, the document D is transported to the sheet ejecting tray 318 by the transfer roller assemblies 319, and thus the duplex scanning operation is completed. Please refer to FIGS. 4 and 5. The sheet transfer channel 316 has two bending portions in order to increase the length of the sheet transfer channel 316. By means of the bending portions, the volume of the document feeder case 311 could be reduced and thus a slim-type duplex scanning apparatus is achievable according to the present invention.

From the above description, the scanning glass plate and the first light source are included in the automatic document feeder of the duplex scanning apparatus, so that the scanning operation is performed in the automatic document feeder and the scanning quality is enhanced. During the duplex scanning operation is performed by the duplex scanning apparatus of the present invention, the first light beam or the second light beam could be reflected by the movable reflective mirror when the rotating angle or the position of the movable reflective mirror is adjusted. Since the movable reflective mirror is simply rotated or moved by the power source (i.e. the transmission mechanism) without need of moving the whole scanning module, the process of performing the duplex scanning operation by the duplex scanning apparatus of the present invention could meet a power-saving requirement.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex scanning apparatus for scanning an image of a document, said duplex scanning apparatus comprising:
    an automatic document feeder for transporting said document, said automatic document feeder comprising:
        a document feeder case;
        a scanning glass plate disposed in a first scan region; and
        a first light source disposed beside said first scan region for emitting a first light beam, which is projected on a first side of said document; and
    a flatbed image scanner for scanning said document, said flatbed image scanner comprising:
        a scanner case disposed under said document feeder case, and comprising a first perforation and a second perforation, wherein said first perforation is arranged under said first scan region, and said second perforation is arranged under a second scan region;
        a glass platform covering said first perforation and said second perforation;
        a second light source disposed beside said second scan region for emitting a second light beam, which is projected on a second side of said document; and
        a scanning module for scanning said document, and comprising a movable reflective mirror, a plurality of fixed reflective mirrors for reflecting said first light beam or said second light beam, an optical sensing module for receiving said first light beam or said second light beam, and a transmission mechanism connected with said movable reflective mirror for rotating said movable reflective mirror by a first angle or a second angle, wherein said first light beam is reflected by said movable reflective mirror when said movable reflective mirror is rotated by said first angle, and said second light beam is reflected by said movable reflective mirror when said movable reflective mirror is rotated by said second angle, wherein the optical path length of said first light beam is substantially equal to that of said second light beam.

2. The duplex scanning apparatus according to claim 1 wherein said optical sensing module comprises:
    a lens for focusing said first light beam or said second light beam; and
    an optical sensor for receiving said first light beam or said second light beam, and converting first light beam or said second light beam into a corresponding electronic signal.

3. The duplex scanning apparatus according to claim 2 wherein said optical sensor is a charge coupled device (CCD).

4. The duplex scanning apparatus according to claim 1 wherein said automatic document feeder further comprises a sheet-pressing element, wherein said sheet-pressing element is disposed in said first scan region for pressing said document, so that said document is kept flat while passing through said first scan region.

5. The duplex scanning apparatus according to claim 4 wherein said sheet-pressing element is a sheet-pressing slice.

6. The duplex scanning apparatus according to claim 1 wherein said document feeder case further comprises a light-transmissive channel arranged between said scanning glass plate and said flatbed image scanner, so that said first light beam is permitted to be directed to said flatbed image scanner through said light-transmissive channel.

7. The duplex scanning apparatus according to claim 1 wherein said automatic document feeder further comprises a sheet transfer channel for leading said document, and said sheet transfer channel runs through said first scan region and said second scan region.

8. The duplex scanning apparatus according to claim 7 wherein the overall length of said sheet transfer channel from said first scan region to said second scan region is greater than or equal to a letter-size length.

9. The duplex scanning apparatus according to claim 7 wherein said automatic document feeder further comprises:
    a sheet input tray arranged at a first terminal of said sheet transfer channel for placing said document that has not been scanned; and
    a sheet ejecting tray arranged at a second terminal of said sheet transfer channel for placing said document that has been scanned.

10. The duplex scanning apparatus according to claim 7 wherein said automatic document feeder further comprises a plurality of transfer roller assemblies, which are arranged in the sheet transfer channel for transporting said document in said sheet transfer channel.

11. A duplex scanning apparatus for scanning an image of a document, said duplex scanning apparatus comprising:
an automatic document feeder for transporting said document, said automatic document feeder comprising:
a document feeder case;
a scanning glass plate disposed in a first scan region; and
a first light source disposed beside said first scan region for emitting a first light beam, which is projected on a first side of said document; and
a flatbed image scanner for scanning said document, said flatbed image scanner comprising:
a scanner case disposed under said document feeder case, and comprising a first perforation and a second perforation, wherein said first perforation is arranged under said first scan region, and said second perforation is arranged under a second scan region;
a glass platform covering said first perforation and said second perforation;
a second light source disposed beside said second scan region for emitting a second light beam, which is projected on a second side of said document; and
a scanning module for scanning said document, and comprising a movable reflective mirror, a plurality of fixed reflective mirrors for reflecting said first light beam or said second light beam, an optical sensing module for receiving said first light beam or said second light beam, and a transmission mechanism connected with said movable reflective mirror for moving said movable reflective mirror to a first position or a second position, wherein said first light beam is reflected by said movable reflective mirror when said movable reflective mirror is located at said first position, and said second light beam is reflected by said movable reflective mirror when said movable reflective mirror is located at said second position, wherein the optical path length of said first light beam is substantially equal to that of said second light beam.

12. The duplex scanning apparatus according to claim 11 wherein said optical sensing module comprises:
a lens for focusing said first light beam or said second light beam; and
an optical sensor for receiving said first light beam or said second light beam, and converting first light beam or said second light beam into a corresponding electronic signal.

13. The duplex scanning apparatus according to claim 12 wherein said optical sensor is a charge coupled device (CCD).

14. The duplex scanning apparatus according to claim 11 wherein said automatic document feeder further comprises a sheet-pressing element, wherein said sheet-pressing element is disposed in said first scan region for pressing said document, so that said document is kept flat while passing through said first scan region.

15. The duplex scanning apparatus according to claim 14 wherein said sheet-pressing element is a sheet-pressing slice.

16. The duplex scanning apparatus according to claim 11 wherein said document feeder case further comprises a light-transmissive channel arranged between said scanning glass plate and said flatbed image scanner, so that said first light beam is permitted to be directed to said flatbed image scanner through said light-transmissive channel.

17. The duplex scanning apparatus according to claim 11 wherein said automatic document feeder further comprises a sheet transfer channel for leading said document, and said sheet transfer channel runs through said first scan region and said second scan region.

18. The duplex scanning apparatus according to claim 17 wherein the overall length of said sheet transfer channel from said first scan region to said second scan region is greater than or equal to a letter-size length.

19. The duplex scanning apparatus according to claim 17 wherein said automatic document feeder further comprises:
a sheet input tray arranged at a first terminal of said sheet transfer channel for placing said document that has not been scanned; and
a sheet ejecting tray arranged at a second terminal of said sheet transfer channel for placing said document that has been scanned.

20. The duplex scanning apparatus according to claim 17 wherein said automatic document feeder further comprises a plurality of transfer roller assemblies, which are arranged in the sheet transfer channel for transporting said document in said sheet transfer channel.

* * * * *